(12) United States Patent
Minazawa (10) Patent No.: US 7,937,967 B2
(45) Date of Patent: May 10, 2011

(54) METHOD OF MANUFACTURING A GLASS SUBSTRATE, GLASS SUBSTRATE MANUFACTURED BY THE METHOD, AND MAGNETIC RECORDING MEDIUM USING THE GLASS SUBSTRATE

(75) Inventor: Hiroshi Minazawa, Matsumoto (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 121 days.

(21) Appl. No.: 12/230,548

(22) Filed: Aug. 29, 2008

(65) Prior Publication Data

US 2009/0098998 A1    Apr. 16, 2009

(30) Foreign Application Priority Data

Sep. 6, 2007    (JP) ................... 2007-231505

(51) Int. Cl.
  C03C 23/00    (2006.01)
  C03B 32/00    (2006.01)
  B32B 17/06    (2006.01)
  C03C 14/00    (2006.01)
(52) U.S. Cl. .............. 65/30.1; 65/30.12; 428/846.9; 428/848.8; 501/55
(58) Field of Classification Search ............... 65/31, 88, 65/472, 473, 1, 30.1, 30.12, 30.14; 216/97, 216/100, 84; 360/135, 215; 501/9, 64, 70, 501/69, 55; 428/847.2, 437, 848.8, 1.1, 141, 428/846.9, 64.1; 369/215, 272.1, 275.1; 451/41
See application file for complete search history.

(56) References Cited

U.S. PATENT DOCUMENTS

| | | | | |
|---|---|---|---|---|
| 3,970,422 | A | * | 7/1976 | Maeda et al. ................... 8/523 |
| 4,533,601 | A | * | 8/1985 | Hermann et al. ............. 428/437 |
| 6,134,918 | A | | 10/2000 | Eto et al. |
| 6,312,841 | B1 | | 11/2001 | Watanabe et al. |
| 6,387,516 | B2 | * | 5/2002 | Shichiri et al. .............. 428/437 |
| 6,521,347 | B1 | * | 2/2003 | Anderson et al. ........... 428/437 |
| 6,599,630 | B1 | * | 7/2003 | Fugiel et al. ................. 428/848 |
| 2003/0114291 | A1 | * | 6/2003 | Koyama et al. ................ 501/64 |
| 2003/0125188 | A1 | * | 7/2003 | Koyama et al. ................ 501/70 |
| 2008/0213626 | A1 | | 9/2008 | Kobayashi et al. |

FOREIGN PATENT DOCUMENTS

| | | |
|---|---|---|
| JP | 10-194789 | 7/1998 |
| JP | 10-226539 | 8/1998 |
| JP | 2000-082211 | 3/2000 |
| JP | 2002-220259 | 8/2002 |
| JP | 2002-362944 | 12/2002 |
| JP | 2003-030828 | 1/2003 |
| JP | 2004-059391 | 2/2004 |

OTHER PUBLICATIONS

Translation JP 2002-220259 Onoda et al (Dec. 2002).*
Translation JP 2002-362944 Onoda et al (Aug. 2002).*
Translation Hisayoshi et al of JP 10-226539 (Aug. 25, 1998).*
Translation Koichi of JP 2004-059391 (Feb. 26, 2004).*

* cited by examiner

Primary Examiner — Kevin M. Bernatz
Assistant Examiner — Louis Falasco
(74) Attorney, Agent, or Firm — Rabin & Berdo, PC (57) ABSTRACT

An object of the present invention is to provide a method of manufacturing a glass substrate containing alkali metals. A glass substrate manufactured by the method exhibits excellent performances including durability by virtue of suppressing elution of alkali metals.
A method comprises a step of immersing a glass material in an aqueous solution containing a formate to suppress elution of component of the glass material.

9 Claims, 4 Drawing Sheets

METHOD OF MANUFACTURING A GLASS SUBSTRATE, GLASS SUBSTRATE MANUFACTURED BY THE METHOD, AND MAGNETIC RECORDING MEDIUM USING THE GLASS SUBSTRATE

CROSS-REFERENCE TO RELATED APPLICATION

This application is based on, and claims priority from, Japanese Patent Application No. 2007-231505 filed on Sep. 6, 2007, the contents of which are incorporated herein by reference.

BACKGROUND OF THE INVENTION

1. Field of the Invention

The present invention relates to a method of manufacturing a glass substrate suitable for incorporation in a magnetic recording medium such as those installed in hard disk drives for computers and consumer appliances. In particular, the invention relates to a method of manufacturing a glass substrate which imparts excellent durability and usefulness for forming a magnetic recording medium. The present invention also relates to a glass substrate manufactured by such a method. The present invention further relates to a magnetic recording medium using the glass substrate.

2. Description of the Related Art

Recently, rapid progress has been made in magnetic recording devices toward enhanced recording density and reduced costs, and random access operation carried out with a magnetic recording medium rotating at a high speed and running with a head having a minute flying height. In order to achieve both high density recording and high speed access in a magnetic recording device, it is necessary to reduce the distance between the magnetic disk and the recording head, that is, the head flying height, and, at the same time, to increase the rotation speed of the magnetic disk.

Magnetic recording media typically use primarily a substrate of aluminum having Ni—P plating thereon. In magnetic recording devices for mobile application, however, glass substrates are known to be advantageous for achieving high shock resistance, as well as the above requirements, since a glass substrate exhibits high rigidity and hardly deforms even at high speed rotation, and the surface thereof has a high smoothness.

With increasing demand for magnetic disk drives for use in household information appliances, the need is arising for insuring a plentiful supply of glass substrates and for further reducing the cost. Glass substrates, which can be easily formed to a disk shape by pressure molding at a temperature higher than the softening temperature, can be mass-produced at a low cost in that temperature range. In manufacturing the glass substrates, a lower molding temperature is advantageous for easy and simple pressure molding. Efforts to lower the molding temperature have been made by adding alkali metal(s) such as lithium, sodium, and potassium into the glass material.

Addition of alkali metal(s) into a glass substrate incorporated in a magnetic recording medium, however, causes alkali corrosion of the magnetic layer in the magnetic recording medium due to elution of the alkali metal from the glass substrate. The elution of alkali metal from the glass substrate occurs on the surface of the glass substrate in the form of precipitation of a carbonate compound formed by the alkali metal and carbon dioxide in the air. This situation may give rise to head crash by contact of the precipitates of alkali carbonate generated on the medium surface with the magnetic head. Therefore, the elution of alkali metals on the glass substrate needs to be suppressed as much as possible. In order to deal with this problem, the following means have been disclosed.

Japanese Unexamined Patent Application Publication No. H10-226539 discloses a technology in which, after lifting the glass substrate from a chemical tempering solution, the glass substrate in a heated state is washed with warm water (solvent) and salt crystals on the substrate are removed utilizing the polarity and thermal energy of the solvent.

Japanese Unexamined Patent Application Publication No. 2000-082211, which corresponds to U.S. Pat. No. 6,312,841, discloses a technology in which a substrate consisting essentially of glass for a magnetic recording medium is subjected to treatment for retarding elution of components of the glass by bringing the substrate in contact with a molten salt that contains hydrogen sulfate and/or pyrosulfate, while being subjected to a treatment for retarding crystallization of the molten salt.

Japanese Unexamined Patent Application Publication No. H10-194789, which corresponds to U.S. Pat. No. 6,134,918, discloses a technology in which the surface of a glass substrate lifted from a chemical treatment liquid is treated with a heated, water-soluble organic solvent, for example, glycerol or polyethylene glycol.

Japanese Unexamined Patent Application Publication No. 2004-059391 discloses a technology in which a glass substrate for a magnetic recording medium, containing alkali metals, is immersed in a melt of organic acid at a temperature ranging from 120° C. to 350° C. and then washed to remove the melt of organic acid or its solidified substance remaining on the surface of the glass substrate so that it is suitable for use in a magnetic recording medium.

Japanese Unexamined Patent Application Publication No. 2002-220259 discloses a technology in which a glass substrate is immersed in an aqueous solution containing lithium salt for exchanging the $Li^+$ for $Na^+$ and $K^+$ on the glass substrate, and binding the $Li^+$, which has a smaller ion radius than that of the $Na^+$ and $K^+$, with non-crosslinking oxygen, firmly in the glass to effectively suppress elution of the alkali metals.

Japanese Unexamined Patent Application Publication No. 2003-030828 discloses a manufacturing method for a glass substrate comprising a step for suppressing elution of alkali metals. In that method, after a chemical reinforcement treatment, the glass substrate is immersed in water under the conditions that the temperature is not lower than 180° C. and no higher than 30° C. above the temperature of the chemical reinforcement treatment, and that the water is pressurized to maintain a liquid state.

The technologies disclosed in the prior art documents discussed above, however, raise the following issues.

In the technologies disclosed in Japanese Unexamined Patent Application Publication No. H10-226539 and Japanese Unexamined Patent Application Publication No. 2000-082211, which corresponds to U.S. Pat. No. 6,312,841, hydronium ions ($H_3O^+$) generated from water included in the treatment liquid are exchanged for ions of the alkali metals in the glass substrate, thereby eliminating $H_2O$ and eventually substituting the alkali metals in the glass for hydrogen atoms. As a consequence, it could be assumed that the surface of the glass substrate is reformed and the alkali metals hardly precipitate on the surface even in an environment of high temperature and high humidity. Nevertheless, the technology of Japanese Unexamined Patent Application Publication No. H10-226539 reduces the alkali metal ions on the glass surface on the one hand, but glass skeletons on the glass surface are possibly destroyed by the high concentration of acid, increasing mobility of the alkali metal ions on the other hand. Therefore, elution of alkali metals may in fact be promoted. The technology of Japanese Unexamined Patent Application Publication No. 2000-082211, which corresponds to U.S. Pat. No. 6,312,841, treats the substrate in a molten salt at about 300° C., which may cause the substrate surface to become coarse.

In the technologies of Japanese Unexamined Patent Application Publication No. H10-194789, which corresponds to U.S. Pat. No. 6,134,918, and Japanese Unexamined Patent Application Publication No. 2004-059391, water is not used as a solvent so that no hydronium ions are generated and so that the glass substrate surface is not reformed. Consequently, there is a possibility that elution of the alkali metals is not prevented sufficiently.

In the technology of Japanese Unexamined Patent Application Publication No. 2002-220259, the solubility of lithium nitrate is 84.5 g in 100 g of water at room temperature, and the boiling point of the aqueous solution of lithium nitrate at this concentration is 113° C. When an aqueous solution at a concentration that allows a treatment temperature higher than 113° C. is used, the lithium nitrate solidifies at room temperature, causing deterioration of maintainability. A treatment at a temperature not higher than 113° C. may degrade ion exchange efficiency.

The technology of Japanese Unexamined Patent Application Publication No. 2003-030828 needs a high pressure vessel so that cost reduction of the fabrication apparatus is inhibited.

Although various technologies have been disclosed for substrates for magnetic recording media as described in the foregoing, demand still exists for a technology to obtain a glass substrate that exhibits excellent performance including durability by suppressing elution of alkali metals from the substrate.

SUMMARY OF THE INVENTION

It is therefore an object of the present invention to provide a method of manufacturing a glass substrate containing alkali metal(s) that exhibits excellent performance including durability by suppressing elution of the alkali metal. Another object of the invention is to provide a glass substrate manufactured by this method of manufacturing a glass substrate. Still another object of the invention is to provide a magnetic recording medium using the glass substrate.

A method of manufacturing a glass substrate according to the present invention comprises the steps of: providing a glass substrate comprised of glass material; and immersing the glass substrate in an aqueous solution containing water and a formate. The method of manufacturing a glass substrate can be applied to manufacturing a magnetic recording medium, such as those installed in hard disk drives for computers or consumer appliances.

In the method of manufacturing a glass substrate of the present invention, the formate is preferably potassium formate, the aqueous solution has a temperature which is preferably not higher than 200° C., and the glass substrate is preferably immersed in the aqueous solution for a time of at least 1 minute. Preferably, the potassium formate has a concentration in the aqueous solution which is at most 77.7 wt %. In that case, the aqueous solution has a temperature which is preferably not higher than 140° C. and the immersion time of the glass substrate in the aqueous solution is preferably not longer than 270 minutes. In the method of manufacturing a glass substrate of the present invention, the glass material preferably comprises alkali metals.

Glass substrates obtained by this method of manufacturing a glass substrate are included in the present invention. Magnetic recording media using the glass substrate are also included in the present invention.

A method of manufacturing a glass substrate of the invention comprises a step of immersion treatment of a glass material for the glass substrate in order to suppress elution of alkali metals contained in the glass substrate from the glass substrate. Specifically, the immersion treatment uses an aqueous solution containing a formate, which exhibits large solubility in water, in particular, an aqueous solution containing potassium formate. This means provides an aqueous solution at a high temperature by virtue of a sufficiently high molar elevation of boiling point. This means raises the ion exchange rate between hydronium ions ($H_3O^+$) generated from the water and alkali metals in the glass material of the glass substrate to achieve reformation of the surface of the glass material of the glass substrate. This mechanism increases the rate of the ion exchange reaction and favorably suppresses subsequent elution of alkali metals, thus, providing a glass substrate for magnetic recording media exhibiting excellent performance including durability.

In particular, by using an aqueous solution of potassium formate having a concentration not higher than 77.7 wt % and setting the temperature of the aqueous solution during the immersion treatment at 142° C. or lower, preferably at 140° C. or lower, the potassium formate does not precipitate even at room temperature so that the liquid state is maintained. Thus, maintenance can be carried out very easily.

The inventor of the present invention has made extensive studies for obtaining a glass substrate for magnetic recording media exhibiting excellent performance including durability by suppressing the subsequent elution of alkali metals, and found that it is advantageous in the reformation treatment of a glass substrate surface to produce a specified aqueous solution using a material exhibiting a large molar elevation of the boiling point of water, which is the solvent in the treatment solution, and to immerse the glass material in that aqueous solution.

Use of such an aqueous solution enhances the ion exchange rate between hydronium ions ($H_3O^+$) generated from the water and alkali metals in the glass material, and, thus, raises the rate of the ion exchange reaction. Under this situation, the alkali metal ions on the surface layer of the glass substrate exchange for hydronium ions ($H_3O^+$) contained in the aqueous solution of, e.g., potassium formate. As a result, the surface layer of the glass substrate contains smaller amount of alkali metal ions than the inner layer of the substrate and contains relatively large amount of $H^+$. This situation suppresses subsequent elution of alkali metals from the glass substrate. Although the ion exchange reaction also occurs using an aqueous solution at a low temperature, it needs several days of immersion time using an aqueous solution at 100° C. to attain the same effect as the effect that is obtained by immersion treatment for 1 min. using an aqueous solution at 200° C. Thus, the ion exchange reaction is advantageously carried out at a higher temperature.

The inventor also found that the use of formate exhibiting high solubility at room temperature for the material contained in the immersion solution is advantageous because of very easy maintenance work including exchange of the solution.

A formate exhibits higher solubility than the lithium nitrate disclosed in Japanese Unexamined Patent Application Publication No. 2002-220259; potassium formate, in particular, shows remarkably high solubility. Specifically, potassium formate dissolves to an amount of 347.5 g in 100 g of water at 25° C., wherein the concentration is 77.7 wt %. The molar elevation of boiling point is 42° C. at this concentration, which means the boiling point of the aqueous solution is 142° C. When immersion treatment is carried out with an aqueous solution of potassium formate at a concentration of 77.7 wt % within the upper limit of soluble concentration, the aqueous solution is in a liquid state at room temperature (25° C.). Hence, maintenance work including exchange of the solution can be conducted very simply. The temperature of 142° C. mentioned above is a boiling point at 1 atm, and can change slightly at the actual plant site under influence of the atmospheric pressure.

Some preferred embodiment of the invention based on these findings by the inventor will be described with reference to the accompanying drawings. The following examples are only illustrative and can be changed and modified within creative ability of ordinary person skilled in the art.

DETAILED DESCRIPTION OF THE INVENTION

Method of Manufacturing a Glass Substrate

Formation of a Glass Substrate

A glass substrate in a doughnut shape containing alkali metals such as Li, Na, and K is to be manufactured. First, a glass material is formed into a predetermined shape by press molding or by cutting out from a glass plate.

Useful glass materials include alumino-silicate glass, soda lime glass, soda alumino-silicate glass, alumino-boro-silicate glass, boro-silicate glass, and crystallized glass. A preferred material is an amorphous glass material containing alkali metals.

Any known means can be used in the press molding.

Any known means can be used in the cutting out process from a glass plate.

The surface of the glass substrate obtained by these methods is finished to attain a center line average roughness (Ra) of 0.2 nm by lapping, polishing or the like. A small Ra of the substrate surface reduces the orientation dispersion angle ($\Delta\theta 50$) of a magnetic layer and enhances the signal to noise ratio (S/N ratio).

Lapping can be carried out by a lapping machine with a cast iron table using a working liquid including abrasive grains of silicon carbide (SiC).

Polishing can be conducted by a commonly known double side polishing machine using a polishing cloth or a urethane foam polishing pad and a slurry of ceria, colloidal silica, or the like. The polishing process can be carried out repeatedly until a desired degree of smoothness is obtained.

After that, the glass substrate is cleaned by at least one of the processes of scrub cleaning and ultrasonic cleaning, followed by drying to remove cleaning solvent, such as isopropyl alcohol (IPA) drying, to obtain a clean glass surface.

The scrub cleaning process is preferably carried out by rubbing the object with a sponge, such as a poly(vinyl alcohol) (PVA) sponge. Alternatively or additionally, the scrub cleaning can be conducted using a neutral detergent or an alkali detergent.

Ultrasonic cleaning is conducted at a frequency ranging from several tens of kHz to several MHz depending on the degree of contamination, that is, the size of foreign matter to be removed. The immersion liquid in this process can be pure water with a resistivity of at least 10 M$\Omega$-cm. The cleaning can also be carried out using a neutral detergent, alkali detergent or the like. In addition, ultrasonic cleaning processes with different conditions can be combined.

Any known method can be used in the isopropyl alcohol (IPA) vapor drying.

Treatment to Suppress Elution of Alkali Metals from a Glass Substrate

Subsequently on the glass substrate after completion of the cleaning step described above, a treatment is conducted to suppress elution of constituents of the glass, especially alkali metal constituents from the surface and the end face of the glass substrate. In this treatment, the glass material is immersed in an aqueous solution of formate.

An aqueous solution of potassium formate (HCOOK) is preferable for the aqueous solution of formate because of its significant molar elevation of the boiling point of water.

Formates in addition to potassium formate may be used to obtain the desired molar elevation of the boiling point of water. As for ammonium formate, although it exhibits some degree of solubility, ammonia volatilizes in a heated condition, which discounts the elevation of boiling point from the initially expected value.

In addition to formates, mention is made of organic base-containing compounds of primary, secondary and tertiary amines having a low molecular weight. As for methyl formate, dimethyl formate, trimethyl formate, ethyl formate, and diethyl formate, although they exhibit high solubility in water, elevation of the boiling point cannot be expected because of their low boiling point. In addition, these organic bases are flammable causing difficulty in handling.

Triethyl formate is not favorable because of its low solubility in water. A quaternary nitrogen cation, such as tetramethyl ammonium, which is used in the surface treatment of semiconductors, decomposes and vaporizes at a temperature ranging from 135° C. to 140° C. and its use is thus not favorable.

As discussed above, among the various formate compounds, potassium formate is preferred because it exhibits a peculiar material property which meets the demand in the present invention. Potassium formate has the property of providing a large molecular elevation of boiling point and is inexpensive. Therefore, potassium formate is exceptionally suited for the immersion treatment of the present invention.

Concerning formic acid itself, it has a boiling point of 100.56° C. and the elevation of the boiling point of water cannot be expected. Moreover, it is flammable and hard to handle, and its use is thus not favorable.

For obtaining a desired liquid temperature utilizing the molar elevation of boiling point of an aqueous solution of potassium formate, an aqueous solution of potassium formate at any concentration can be used. For example, in order to obtain a liquid temperature of 140° C., it is sufficient to dissolve 330 g of potassium formate in 100 g of water, the concentration being 76.7 wt %. For obtaining a liquid temperature of 200° C., it is sufficient to dissolve 820 g of potassium formate in 100 g of water. The concentration in this case is 89.1 wt %.

In order to attain compatibility, at a high level, between maintaining surface quality of the glass substrate and obtaining the effect of suppressing elution of alkali metals, it is preferably that the temperature of the aqueous solution of the formate is not higher than 200° C. and the immersion time of the glass material in the aqueous solution is at least 1 min.

When the concentration of potassium formate in the aqueous solution of formate is not more than 77.7 wt %, the concentration being within the limiting concentration of dissolution, the aqueous solution is in a liquid state at room temperature (25° C.) and, thus, maintenance work, such as exchange of liquid can be carried out very easily.

In order to improve maintainability, as well as compatibility between ensuring surface quality of the glass substrate and obtaining the effect of suppressing elution of alkali metals, it is preferable that the temperature of the aqueous solution of the formate is not higher than 140° C. and the immersion time of the glass substrate in the aqueous solution is at most 270 min.

The glass substrate after completion of the treatment for suppressing elution of alkali metals is taken out from the aqueous solution of potassium formate at a high temperature and immediately immersed in warm water. Thus, the potassium formate attached on the glass substrate surface is dissolved and removed, avoiding degradation of the quality of the glass substrate due to potassium formate remaining on the surface. The process of immersion in warm water is sufficient if the potassium formate attached on the glass substrate surface is thoroughly dissolved and removed, and can be an immersion process in a warm water at 70° C. for 10 min., for example. A specific composition of the warm water can be pure water with a resistivity of at least 10 MΩ-cm.

After that, the glass substrate is subjected to scrub cleaning, ultrasonic cleaning, and isopropyl alcohol (IPA) vapor drying in the same manner as described in the section of "Formation of glass substrate", to obtain a clean surface for the glass substrate.

Figure 1:
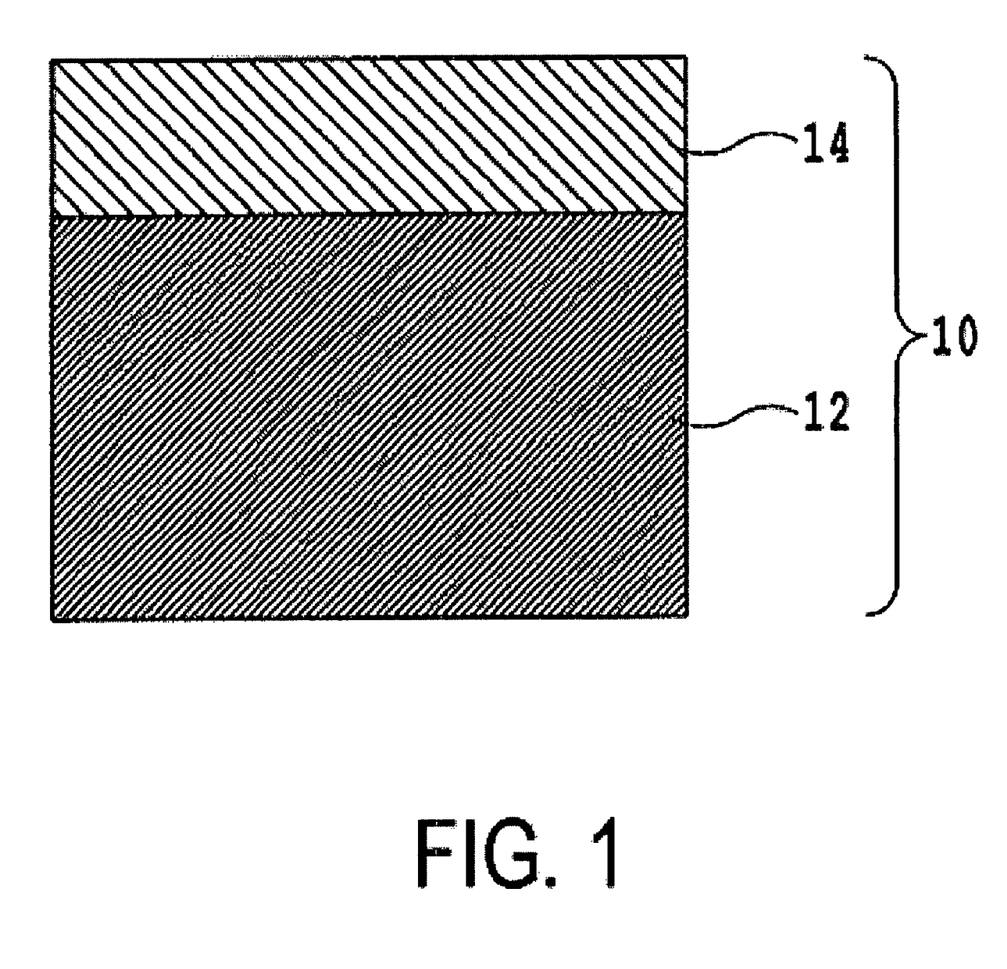
FIG. 1 is a schematic sectional view of an example of a glass substrate according to the present invention.

FIG. 1 is a schematic sectional view of an example of the structure of a glass substrate obtained by the procedure described above. The glass substrate 10 in FIG. 1 consists of an inner layer 12 and a surface layer 14 located on the inner layer 14.

In the surface layer 14 of the glass substrate 10, alkali metal ions have been exchanged for hydronium ions ($H_3O^+$) generated from the water contained in the aqueous solution of potassium formate by virtue of the above-described treatment for suppressing elution of alkali metal component. As a result, the surface layer 14 contains a smaller amount of alkali metal ions and a relatively larger amount of $H^+$ as compared with the inner layer 12 extending under the surface layer 14.

Consequently, the effect of suppressing elution of alkali metals is attained on the surface of the glass substrate 10 in this structure. Therefore, the glass substrate 10 is suited for a magnetic recording medium exhibiting excellent performance including durability.

Magnetic Recording Medium

A magnetic recording medium using such a glass substrate is described hereinafter. The example of a magnetic recording medium described below is a perpendicular magnetic recording medium. The media of the invention, however, are not limited to such an example but include any type of media that can employ a glass substrate as described hereinbefore.

Figure 2:
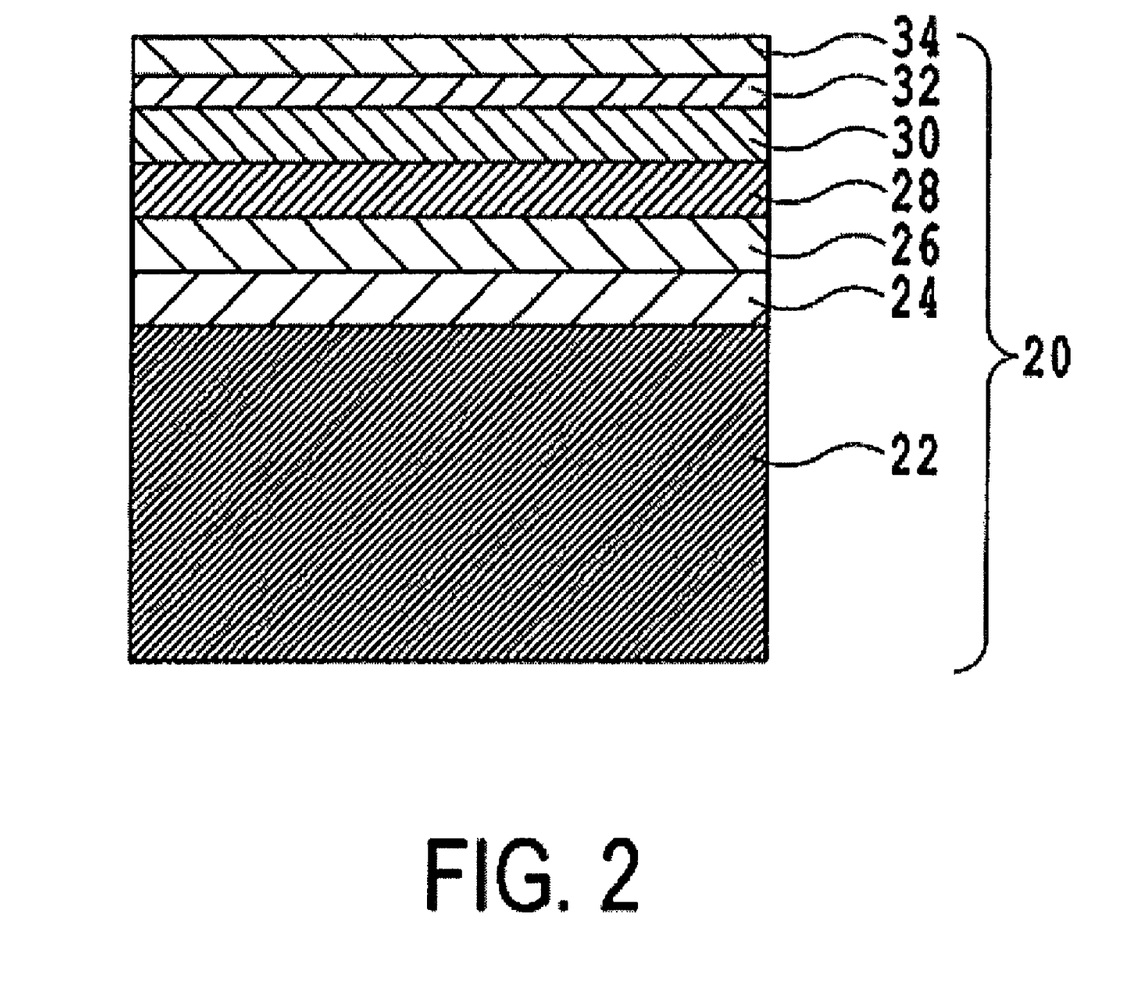
FIG. 2 is a schematic sectional view of an example of a magnetic recording medium according to the present invention.

FIG. 2 is a schematic sectional view of an example of structure of a magnetic recording medium using a glass substrate described above. Referring to FIG. 2, a magnetic recording medium 20 comprises a glass substrate 22 obtained as described above, a soft-magnetic backing layer 24 formed on the glass substrate 22, a non-magnetic crystal alignment control layer 26 formed on the soft-magnetic backing layer 24, an underlayer 28 formed on the non-magnetic crystal alignment control layer 26, a magnetic layer 30 formed on the underlayer 28, a protective layer 32 formed on the magnetic layer 30, and a lubricant layer 34 formed on the protective layer 32.

The glass substrate 22 can be of any type as far as it is obtained as described above.

The soft-magnetic backing layer 24, which is optionally provided, controls spread of magnetic flux generated by a magnetic head upon magnetic recording and ensures sufficient magnetic flux in the vertical direction. Useful materials for the soft-magnetic backing layer 24 include a Ni alloy, an Fe alloy, a Co alloy, a Ta alloy and a Zr alloy. Good electromagnetic conversion characteristics can be obtained by using, for example, amorphous CoZr alloys, such as CoZrNb, CoTaZr, and CoTaZrNb, and amorphous Fe—Co alloys, such as CoFeNb, CoFeZrNb and CoFeTaZrNb. In addition, other types of soft-magnetic materials can be used, for example Fe—B alloys and Fe alloys of ferrite structure.

Thickness of the soft-magnetic backing layer 24 preferably ranges from 10 nm to 100 nm in consideration of the structure of the magnetic head used in recording and the productivity of the layer. A film thickness of at least 10 nm provides the effect of controlling spread of the magnetic flux. A thickness at most 100 nm achieves good productivity.

The non-magnetic crystal alignment control layer 26, which is optional, controls alignment and grain size of the underlayer 28 and the magnetic layer 30 formed thereon, and is preferably formed of a material including noble metals such as Au, Ag, and Pt. When the non-magnetic crystal alignment control layer 26 is formed of a material which may be easily oxidized, a high vacuum condition is kept until the step of forming an underlayer 28 to avoid attachment of oxygen and ensure a surface condition without oxidation on the surface of the non-magnetic crystal alignment control layer 26.

The thickness of the non-magnetic crystal alignment control layer 26 is adjusted appropriately so as to attain desired values of the magnetic property and electromagnetic conversion characteristics of the magnetic layer 30, and preferably ranges from 2 nm to 20 nm. A film thickness of at least 2 nm suppresses degradation of alignment of the underlayer 28 and hence of the magnetic layer 30. A film thickness of at most 20 nm avoids excessively large grain size in the non-magnetic crystal alignment control layer 26 thereby achieving minute grain size in the magnetic layer 30 through the minute grain size of the underlayer 28. Thus, degradation of electromagnetic conversion characteristics are prevented.

The underlayer 28 is a non-magnetic layer and has a good alignment and a minimized grain size, thereby improving alignment and minimizing grain size of the magnetic layer 30 which is formed on the underlayer 28. The underlayer suppresses generation of an initial growth layer in the magnetic layer 30, which is undesirable for good magnetic property of the magnetic layer 30. The underlayer 28 can be formed of chromium, for example.

In order to suppress generation of an initial growth layer in the magnetic layer 30, it is important to obtain good crystallinity in the underlayer 28, and the thickness of the underlayer 28 is preferably at least 1 nm. This configuration alleviates degradation of alignment owing to the good crystallinity of the underlayer 28, thereby achieving good alignment and separation between crystal grains in the magnetic layer 30, and further, suppressing generation of the initial growth layer in the magnetic layer 30. By controlling the thickness of the underlayer at most 20 nm, swelling of grains in the underlayer 28 is suppressed thereby suppressing swelling of grains in the magnetic layer 30, too. This control of the thickness of the underlayer 28 achieves high recording density while reducing noise.

The magnetic layer 30 is provided for recording and reproducing information. In order to utilize the magnetic layer 30 for a part of a perpendicular magnetic recording medium, the axis of easy magnetization needs to be aligned vertically to the substrate surface. The magnetic layer 30 is composed of a material including a cobalt-containing alloy. Useful cobalt-containing alloy can be selected from Co—Pt alloys and Co—Cr alloys.

The thickness of the magnetic layer preferably ranges from 8 nm to 20 nm. A thickness not smaller than 8 nm suppresses deterioration of thermal stability; a thickness not larger than 20 nm allows magnetic field of the head to permeate through whole magnetic film achieving good write-in performance.

The protective layer 32 is provided for the purpose of inhibiting corrosion of the magnetic layer 30 and preventing the magnetic layer 30 from damage when the magnetic head comes in contact with the medium. The protective layer 32 can be composed of a commonly used material, for example, a layer mainly composed of C, $SiO_2$, or $ZrO_2$. The thickness of the protective layer 32 can be in the range used in ordinary magnetic recording media for example, in the range of from 2 nm to 5 nm.

The lubricant layer 34 is a layer provided for the purpose of ensuring lubricity between the magnetic head and the medium. The lubricant layer 34 can be composed of a commonly used material, for example, a lubricant such as perfluoropolyether, fluorinated alcohol, or fluorinated carboxylic acid. The thickness of the lubricant layer 34 can be in the range used in ordinary magnetic recording media for example, in the range of from 0.5 nm to 2 nm.

The magnetic recording medium 20 uses a glass substrate 22 according to the present invention that exhibits an effect to suppress elution of alkali metals. Alkali metals do not elute from the glass substrate thereby preventing alkali corrosion. Therefore, corrosion of the magnetic layer in the medium is restrained. Since alkali metals do not elute from the glass substrate of the magnetic recording medium 20, precipitation of a carbonate, for example, does not occur on the surface of the glass substrate, such a carbonate being possibly formed by chemical bonding between the eluted alkali metal and carbon dioxide in the air. Thus, the surface of the medium 20 is prevented from generating precipitates of alkali carbonate thereby avoiding the risk of a head crash. Therefore, magnetic recording medium 20 achieves good performance including durability and excellent quality.

Method of Manufacturing a Magnetic Recording Medium:

The following describes an example of a method of manufacturing a magnetic recording medium of the invention as shown in FIG. 2. The example described below contains a soft magnetic backing layer and a non-magnetic crystal alignment control layer, which are optional components in the present invention.

Cleaning of Glass Substrate 22

Glass substrate 22 is cleaned. The cleaning can be carried out by a solution cleaning method using an acid or an alkali, which are examples of some agents that are highly effective for eliminating a naturally-formed oxide film. The cleaning can also be conducted by dry cleaning using various types of plasma or ions. This dry cleaning, in particular, is preferable in view of the high precision in design dimensions, liquid waste treatment of used agents, and automation of the cleaning process.

Formation of Soft-Magnetic Backing Layer 24

The cleaned glass substrate 22 is introduced into a sputtering apparatus. The soft-magnetic backing layer 24 is formed by means of a sputtering method, for example, a DC magnetron sputtering method, using a predetermined target. Preferred conditions in the sputtering process are: argon atmosphere in the sputtering apparatus, pressure in the apparatus ranging from 0.7 to 1.5 Pa, no heating for the apparatus, deposition rate ranging from 2 to 10 nm/s, and a distance between the target and the substrate ranging from 5 to 15 mm.

Formation of Non-Magnetic Crystal Alignment Control Layer 26

The non-magnetic crystal alignment control layer 26 is formed on the soft-magnetic backing layer 24 by means of a sputtering method, for example, a DC magnetron sputtering method using a predetermined target. Preferred conditions in this sputtering process are: argon atmosphere in the sputtering apparatus, pressure in the apparatus ranging from 0.7 to 2 Pa, no heating for the apparatus, deposition rate ranging from 2 to 10 nm/s, and a distance between the target and the substrate ranging from 5 to 15 mm.

Formation of Underlayer 28

Underlayer 28 is formed on the non-magnetic crystal alignment control layer 26. When an aromatic compound is used for the underlayer 28, the method for forming the underlayer 28 is preferably a vapor deposition method which does not destroy the molecular structure of the compound.

Deposition of the underlayer 28 is carried out on the non-magnetic crystal alignment control layer 26 by means of a sputtering method, for example, a DC magnetron sputtering method using a predetermined target Preferred conditions in this sputtering process are: argon atmosphere in the sputtering apparatus, pressure in the apparatus ranging from 2.5 to 12 Pa, no heating for the apparatus, deposition rate ranging from 2 to 10 nm/s, and a distance between the target and the substrate ranging from 5 to 15 mm.

Formation of Magnetic Layer 30

Magnetic layer 30 is formed on underlayer 28 by means of a sputtering method, for example, a DC magnetron sputtering method using a predetermined target. Preferred conditions in this sputtering process are: argon atmosphere in the sputtering apparatus, pressure in the apparatus ranging from 0.7 to 4 Pa, no heating for the apparatus, deposition rate ranging from 2 to 10 nm/s, and a distance between the target and the substrate ranging from 5 to 15 mm.

Formation of Protective Layer 32

After transferring a laminated structure, including the soft magnetic backing layer 24, the non-magnetic crystal alignment control layer 26, the underlayer 28, and the magnetic layer 30, formed sequentially on the glass substrate 22 from the sputtering apparatus into a vacuum deposition apparatus, a protective layer 32 is formed on the magnetic layer 30 by means of a CVD method.

Other methods can be used for forming the protective layer 32, such as a sputtering method using a carbon target and an ion beam method, and these can be concluded according to the known principles.

The CVD method and the ion beam method, in particular, can obtain a thin protective layer which achieves high recording density at a high level.

Formation of Lubricant Layer 34

Finally, the laminated structure with the protective layer 32 formed thereon is taken out from the vacuum deposition apparatus and a lubricant layer 34 is formed on the protective layer 32 by means of a dip coating method. Thus, a perpendicular magnetic recording medium according to the invention is produced.

EXAMPLES

Formation of Glass Substrate

Example 1

The following describes the present invention in further detail referring to some specific embodiment examples according to the invention, and demonstrates the effects of the invention.

Description is made on an example using an amorphous glass substrate with a disk shape having dimensions of an outer diameter of 65 mm, an inner diameter of 20 mm, and a thickness of 0.635 mm. First, a glass material with a disk shape having dimensions of an outer diameter of 65 mm, an inner diameter of 20 mm, and a thickness of 1.250 mm was prepared. This glass material contained $SiO_2$: 66 mol %, $Li_2O$: 10 mol %, $Na_2O$: 10 mol %, $Al_2O_3$: 10 mol %, $B_2O$: 2 mol %, and $ZrO_2$: 2 mol %.

A lapping process was conducted on the surface of the glass material to polish it down to a thickness of 0.67 mm. The lapping process was conducted using a lapping machine with a cast iron table and a working liquid which is a solution containing 10 wt % of abrasive grains of #1500 silicon carbide (SiC), under a working pressure of 100 $gf/cm^2$.

Then, a primary polishing process was conducted down to a thickness of 0.64 mm. The primary polishing process was carried out using a commonly known double side polishing machine, polishing cloth made of a urethane foam polishing pad, a slurry of 10 wt % ceria with a grain diameter of 1.5 μm, and with a working pressure of 100 $gf/cm^2$.

Subsequently, a secondary polishing process was conducted down to a thickness of 0.635 mm and a center line average roughness (Ra) of 0.2 nm. The secondary polishing process was carried out using a commonly known double side polishing machine, a polishing cloth made of a urethane foam polishing pad, a slurry of 10 wt % colloidal silica with a grain diameter of 80 nm, and with a working pressure of 100 $gf/cm^2$.

Then, processes of scrub cleaning, ultrasonic cleaning, and isopropyl alcohol (IPA) vapor drying were conducted to obtain a clean surface.

The glass material having the thus-cleaned surface was subjected to a treatment to suppress elution of alkali metals by immersing it in an aqueous solution of potassium formate. The concentration of the potassium formate was adjusted so as to attain a molar elevation of boiling point of water of 55° C., that is, a boiling point of 155° C., thus obtaining an aqueous solution of potassium formate of 81.9 wt %.

The aqueous solution of potassium formate was heated up to 140° C. and the glass material was immersed in the solution for 15 min. The reason for the treatment temperature of 140° C. was because, in order to obtain an aqueous solution of potassium formate at this temperature, a concentration of potassium formate of 77.7 wt % is sufficient and this concentration is the maximum concentration for the solution not to solidify at room temperature.

Then, the glass substrate was taken out from the aqueous solution of potassium formate and immediately immersed in warm water at 70° C. for 10 min. to remove the potassium formate attached on the surface of the glass material.

Finally, processes of scrub cleaning, ultrasonic cleaning, and isopropyl alcohol (IPA) vapor drying were conducted to obtain a clean surface. Thus, a glass substrate of Example 1 was obtained.

Example 2

A glass substrate of Example 2 was obtained in the same manner as in Example 1 except that the immersion time of the glass material in the aqueous solution of potassium formate was 30 min.

Example 3

A glass substrate of Example 3 was obtained in the same manner as in Example 1 except that the immersion time of the glass material in the aqueous solution of potassium formate was 60 min.

Example 4

A glass substrate of Example 4 was obtained in the same manner as in Example 1 except that the immersion time of the glass material in the aqueous solution of potassium formate was 120 min.

Example 5

A glass substrate of Example 5 was obtained in the same manner as in Example 1 except that the immersion time of the glass material in the aqueous solution of potassium formate was 180 min.

Example 6

A glass substrate of Example 6 was obtained in the same manner as in Example 1 except that the immersion time of the glass material in the aqueous solution of potassium formate was 270 min.

Example 7

A glass substrate of Example 7 was obtained in the same manner as in Example 1 except that the immersion time of the glass material in the aqueous solution of potassium formate was 300 min.

Example 8

A glass substrate of Example 8 was obtained in the same manner as in Example 1 except that the temperature of the aqueous solution of potassium formate was 120° C. and the immersion time of the glass material in the aqueous solution of potassium formate was 270 min.

Example 9

A glass substrate of Example 9 was obtained in the same manner as in Example 8 except that the temperature of the aqueous solution of potassium formate was 130° C.

Example 10

A glass substrate of Example 10 was obtained in the same manner as in Example 8 except that the temperature of the aqueous solution of potassium formate was 150° C.

Comparative Example 1

A glass substrate of Comparative Example 1 was obtained in the same manner as in Example 1 except that the immersion treatment of the glass material in the aqueous solution of potassium formate was not conducted.

Comparative Example 2

An immersion treatment was conducted using an aqueous solution of lithium nitrate obtained by dissolving lithium nitrate-hydrate in place of the aqueous solution of potassium formate. A concentration of the lithium nitrate was adjusted to attain a molar elevation of boiling point of water of 55° C., that is, a boiling point of 155° C. Specifically, the solution used was a 78.7 wt % aqueous solution of lithium nitrate. The treatment temperature and the immersion time were 140° C. and 60 min., respectively, which were the same values as in Example 3.
Evaluation Items Concerning Effects of the Treatment for Suppressing Elution of Alkali Metals:
Measurement of Amount of Alkali Metal Ions
(1) The glass substrates of Examples 1 through 10 and Comparative Examples 1 and 2 were left in a thermostatically controlled environment at a temperature of 80° C. and a relative humidity of 85% for 96 hr.
(2) Each glass substrate was then put into a vessel of Teflon (registered trade mark) with a volume of 0.5 L and 10 mL of ultrapure water with an electric resistivity of not less than 18 MΩcm was added.
(3) The Teflon vessel was then oscillated for 3 min. to extract alkali metal ions.
(4) Measurement of amount of alkali metal ions was conducted on the obtained extraction liquid by induction-coupling plasma emission spectral analysis (ICP). The alkali metals in the measurement were three elements of Li, Na, and K, and the total amount of these elements was evaluated.
Surface Condition of Glass Substrate
Surface conditions of the glass substrates of Examples 1 through 10 and Comparative Examples 1 and 2 were evaluated. Specifically, the center line average roughness (Ra) was evaluated using an atomic force microscope (AFM). The center line average roughness is an average of absolute values of height along a standard length and defined by the following formula for two-dimensional region (x-z).

$$Ra = \frac{1}{L}\int_0^L |z(x)|dx,$$ [Formula 1]

where L represents a standard length and z (x) represents height.

The standard length L was set to 10 μm that was the measuring region of the AFM. The Ra values were obtained expanding to a three dimensional space. The Ra value is an index for evaluating surface roughness, that is, irregularities on a surface, and a large value means a coarse surface or a surface with high degree of irregularities. Thus, surface coarsening or precipitation of foreign particles onto the surface causes a large value of Ra.
Number of Errors of Magnetic Recording Medium Magnetic recording media were fabricated by sequentially forming, on the glass substrates of Examples 1 through 10 and Comparative Examples 1 and 2, a soft magnetic backing layer (Ni—Al), an underlayer (Cr), a magnetic layer (Co—Cr—Pt alloy), and a protective layer (carbon) by means of a sputtering method and applying a lubricant layer (perfluoropolyether) by means of a dip-coating method. A non-magnetic crystal alignment control layer was not provided in these magnetic recording media.

These magnetic recording media were stored in an environment at a temperature of 80° C. and relative humidity of 80% for 1,000 hr. The number of errors per each surface before and after the storage was evaluated as an index of reliability.

This number of errors was obtained by actually recording information and reading out the information using a monopole type magnetic head for perpendicular magnetic recording media at a recording density of 300 kFCI (flux change per inch). The value of number of errors is an index for evaluation of errors due to abnormal layer structure or abnormal growth in the size of a recording bit. Accordingly, a large value of this number means a large number of spots of abnormal layer structure or abnormal growth. When the number of errors increases during storage in an environment of high temperature and high humidity, for example, corrosion of the magnetic layer or influence of precipitates can be assumed.

Table 1 shows the evaluation results of measurements of the amount of alkali metal ions, the surface condition on the surface of the glass substrate, and the error number of the magnetic recording medium for Examples 1 through 10 and Comparative Examples 1 and 2.

TABLE 1

| | treatment conditions | | | alkali elution ($ng/cm^2$) | roughness Ra (nm) | errors per surface | |
|---|---|---|---|---|---|---|---|
| | aqueous solution | temp (° C.) | time (min) | | | before | after |
| Ex 1 | potassium | 140 | 15 | 7.94 | 0.20 | 16 | 25 |
| Ex 2 | formate | 140 | 30 | 4.91 | 0.20 | 16 | 21 |
| Ex 3 | | 140 | 60 | 2.78 | 0.21 | 15 | 19 |
| Ex 4 | | 140 | 120 | 1.93 | 0.20 | 16 | 16 |
| Ex 5 | | 140 | 180 | 1.44 | 0.21 | 15 | 17 |
| Ex 6 | | 140 | 270 | 1.12 | 0.19 | 16 | 18 |
| Ex 7 | | 140 | 300 | 0.94 | 0.35 | 16 | 17 |
| Ex 8 | | 120 | 270 | 5.36 | 0.19 | 17 | 18 |
| Ex 9 | | 130 | 270 | 1.88 | 0.20 | 16 | 16 |
| Ex 10 | | 150 | 270 | 0.42 | 0.44 | 17 | 15 |
| Comp Ex 1 | none | — | — | 416.35 | 0.20 | 15 | 256 |
| Comp Ex 2 | lithium nitrate | 140 | 60 | 3.61 | 0.22 | 17 | 21 |

In table 1, "alkali elution" means the amount of elution of alkali metals, specifically the total amount of eluted Li, Na, and K. "Roughness" is the center line average roughness of a surface. The terms "before" and "after" mean before and after storage in an environment at a temperature of 80° C. and relative humidity of 80% for 1,000 hr.

Table 1 shows that the treatment in Examples 1 through 10 has a remarkable effect of suppressing elution of alkali metals as compared with the process in Comparative Example 1 in which a treatment for suppressing elution of alkali metals was not conducted. Table 1 also shows that the processes in Examples 1 through 10 exhibit excellent results concerning change of the number of errors before and after the storage as compared with Comparative Example 1. As for the center line average roughness, Examples 1 through 10 had good results without significant difference among the Examples.

Comparing Example 3 with Comparative Example 2, which were treated under the same conditions, it has been shown that the inventive treatment using an aqueous solution of potassium formate (Example 3) provided superior results concerning elution of alkali metals and number of errors compared to the treatment using lithium nitrate (Comparative Example 2), which is disclosed in Japanese Unexamined Patent Application Publication No. 2002-220259.

Concerning the center line average roughness (Ra), however, the results of Examples 7 and 10 were worse than that of Comparative Example 1. These results show that the treatment conditions in Examples 7 and 10 were set excessively in temperature or time. It can be considered that the temperature of the aqueous solution of potassium formate is preferably not higher than 140° C. and the treatment time is preferably within 270 min.

As described previously, the potassium formate concentration of 77.7 wt % is sufficient to stably attain a temperature of aqueous solution of potassium formate of 140° C., and for a treatment temperature within 140° C., an aqueous solution with a potassium formate concentration within 77.7 wt % can be used. An aqueous solution of potassium formate in this range of concentration does not solidify at room temperature. Therefore, maintenance work such as liquid exchange can be carried out very easily.

Figure 3:
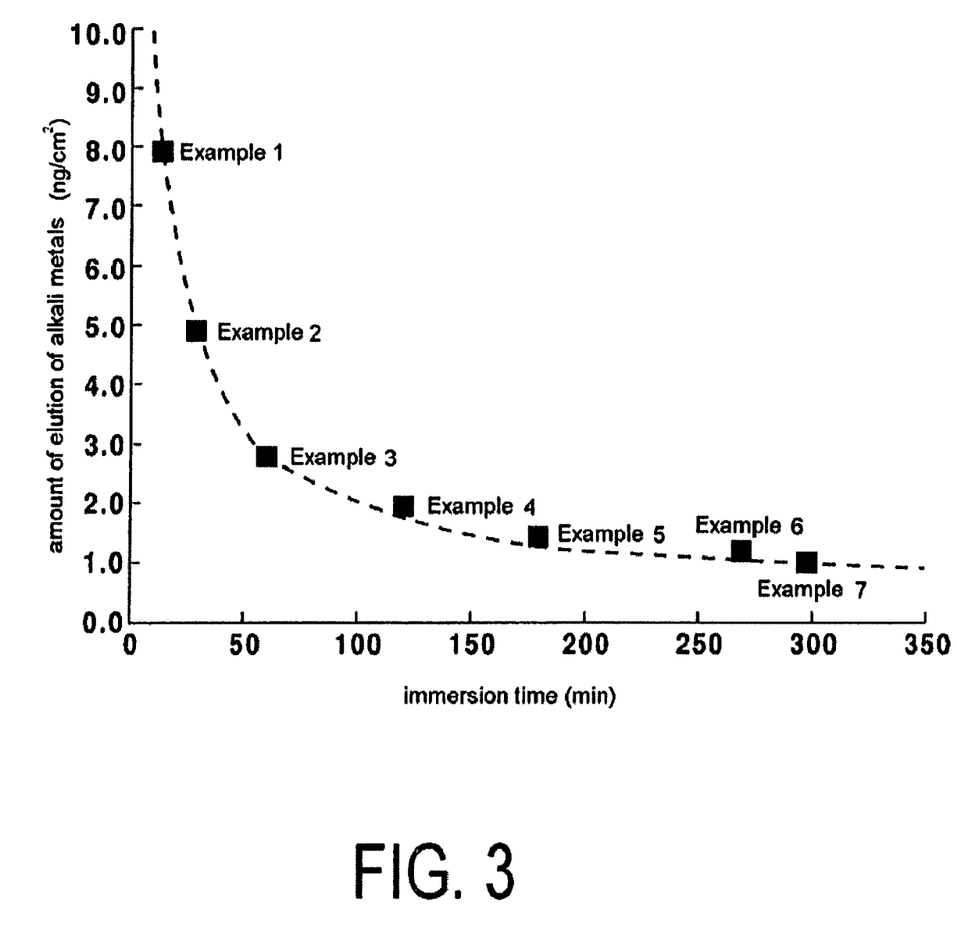
FIG. 3 is a graph showing the relationship between amount of elution of alkali metals and immersion time of glass substrates in the case of a treatment temperature of 140° C. obtained from the results in Examples 1 through 7.
Figure 4:
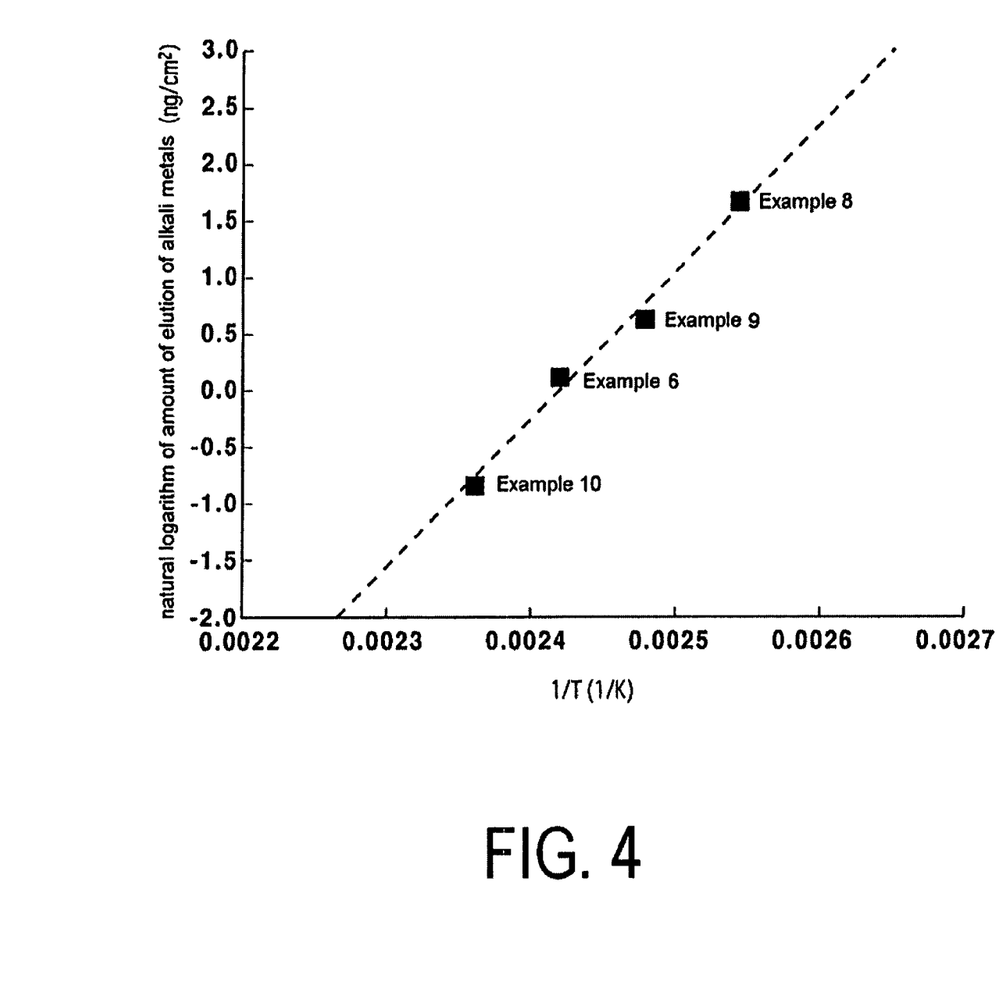
FIG. 4 is a graph showing the relationship between amount of elution of alkali metals and immersion time of glass substrates in the case of a treatment time of 270 min. obtained from the results in Example 6 and Examples 8 through 10.

FIG. 3 is a graph showing the relationship between the amount of elution of alkali metals and the immersion time at a treatment temperature of 140° C. obtained from the results in Examples 1 through 7. FIG. 4 is a graph showing the relationship between the amount of alkali metals and the treatment temperature in the case of treatment time of 270 min. obtained from the results in Example 6 and Examples 8 through 10. In FIG. 4, the ordinate represents the natural logarithm of the amount of elution of alkali metals, and the abscissa represents the reciprocal of the absolute temperature (1/K). FIG. 3 and FIG. 4 indicate significant correlation. From these results, the relation between the amount of elution of alkali metals and the treatment temperature and the treatment time can be represented by the following formula.

$$TC[ng/cm^2] = A \cdot \exp\left(\frac{B}{kT}\right) \cdot t^C. \quad \text{[Formula 2]}$$

Here, TC is the amount of elution of alkali metals, k, the Bolzmann constant, T, the treatment temperature (absolute temperature), and t, the treatment time (min.). FIG. 3 and FIG. 4 allow estimation of $1.0 \times 10^{-12}$ for the constant A, $1.8 \times 10^{-19}$ for the constant B, and $-0.7$ for the constant C.

By using Formula 2, a relation between the treatment temperature and the treatment time can be estimated for obtaining the same effect of suppressing elution of alkali metals. Under the conditions of the temperature of the aqueous solution of potassium formate within 140° C. and the treatment time within 270 min., a condition for the highest treatment temperature in the invention is estimated as follows.

First, it is necessary to set the minimum time for stable treatment, which was set to be 1 min. Considering variation of the treatment time, a treatment less than 1 min. causes difficulty in accurate time control and results in wide range of scattering in treatment time in the case of large quantity treatment, thus such a short time is unpractical. In the case of treatment time of 1 min., the temperature condition is estimated that is equivalent to the conditions of the temperature of aqueous solution of potassium formate within 140° C. and the treatment time within 270 min., and the resulted maximum treatment temperature was 200° C.

Confirmation of the Maximum Treatment Temperature of 200° C.

The maximum treatment temperature of about 200° C. has been confirmed as described below.

Example 11

The concentration of potassium formate was adjusted to attain a molar elevation of boiling point of 115° C., which corresponds to a boiling point of 215° C. Specifically, 90.4 wt % of aqueous solution of potassium formate was used. The temperature of aqueous solution of potassium formate was set at 200° C. and the immersion time was 1 min. Other conditions were the same as in Example 1, and a glass substrate of Example 11 was obtained. In addition, a magnetic recording medium of Example 11 was fabricated.

Example 12

A glass substrate and a magnetic recording medium of Example 12 were obtained in the same manner as in Example 11 except that the boiling point of aqueous solution of potassium formate was set at 210° C.

Table 2 shows evaluation results on the amount of elution of alkali metals, the surface roughness, and the number of errors in Examples 11 and 12.

TABLE 2

| | treatment conditions | | alkali elution | roughness | errors per surface | |
|---|---|---|---|---|---|---|
| | temp (° C.) | time (min) | (ng/cm²) | Ra (nm) | before | after |
| Ex 11 | 200 | 1 | 0.88 | 0.21 | 17 | 18 |
| Ex 12 | 210 | 1 | 0.56 | 0.46 | 16 | 17 |

In table 2, "alkali elution" means the amount of elution of alkali metals, specifically the total amount of eluted Li, Na, and K. "Roughness" is the center line average roughness of a surface. "Before" and "after" means before and after the storage in an environment at a temperature of 80° C. and relative humidity of 80% for 1,000 hr.

Table 2 shows that the center line average roughness degraded in Example 12 as compared with Example 11. This result indicates that 200° C. is reasonable for the maximum treatment temperature in the present invention, and a stable treatment can be carried out under the conditions of treatment temperature of not higher than 200° C. and an immersion time of at least 1 min. The concentration of potassium formate to obtain a temperature of 200° C. is 89.1 wt %. At this concentration, even the potassium formate, which exhibits very high solubility in water, solidifies at room temperature. Hence, at this concentration, other formates such as lithium formate and ammonium formate can be used in place of potassium formate.

Although the lowest treatment temperature is not prescribed, a treatment time longer than 24 hr is not practical in view of productivity. Hence, a treatment temperature of at least 100° C. is preferable. The reason for this temperature is that in order to carry out an immersion treatment in 24 hr having the effect equivalent to Example 1, which resulted in the largest amount of elution of alkali metals in the Examples, a treatment temperature of 102° C. was estimated necessary using Equation 2 and other reasons.

As described above, the results of Examples 1 through 12 and Comparative Examples 1 and 2 have demonstrated that the use of an aqueous solution of potassium formate is essential for suppressing elution of alkali metals including Li, Na and K from a glass substrate containing alkali metals. The potassium formate dissolves in water in a large quantity and provides a high temperature aqueous solution by virtue of a large molar elevation of boiling point, and enhances the ion exchange rate between the hydronium ions ($H_3O^+$) generated from the water and the alkali metal ions in the glass substrate. Consequently, the ion exchange reaction rate increases and density of the alkali metals contained in the surface layer of a glass substrate decreases as compared with in the inner layer. Consequently, such a glass substrate used in a magnetic recording medium exhibits the effect of suppressing elution of alkali metals from the substrate. Therefore, a magnetic recording medium exhibiting excellent performance including durability is provided.

According to the present invention, a glass material is immersed in an aqueous solution containing a formate for treatment of suppressing elution of components of the glass material, in particular, alkali metals, thereby improving performances including durability of the substrate and a magnetic recording medium incorporating the substrate. Therefore, the present invention is advantageous in application to magnetic recording media, which are expected to be installed extensively in hard disk drives in computers or consumer appliances.

While the present invention has been described in conjunction with embodiments and variations thereof, one of ordinary skill, after reviewing the foregoing specification, will be able to effect various changes, substitutions of equivalents and other alterations without departing from the broad concepts disclosed herein. It is therefore intended that Letters Patent granted hereon be limited only by the definition contained in the appended claims and equivalents thereof.

What is claimed is:

1. A method of manufacturing a glass substrate, comprising the steps of:
   a. providing a glass substrate comprised of an alkali metal oxide glass containing an oxide of at least one alkali metal; and
   b. immersing the glass substrate in an aqueous solution containing potassium formate dissolved in water and present in an amount ranging from an amount effective to raise an ion exchange rate between hydronium ions (H3O+) generated from the water and alkali metal in the glass substrate sufficient to achieve reformation of a surface of the glass substrate up to 77.7 wt %,
   wherein immersing takes place at a process temperature ranging from 120° C. to 210° C., and for a process time ranging from 1 to 270 minutes so that subsequent elution of alkali metal from the glass substrate is suppressed.

2. The method of manufacturing a glass substrate according to claim 1, wherein the aqueous solution has a temperature of at most 140° C. during immersing.

3. The method of manufacturing a glass substrate according to claim 1, further comprising removing residual potassium formate by immersing the glass substrate in warm water having a temperature of at least 70° C. after the step of immersing the glass substrate in the aqueous solution containing potassium formate dissolved in water.

4. The method of manufacturing a glass substrate according to claim 3, wherein immersion in the warm water continues for an immersion time of at least 10 min.

5. A glass substrate comprised of an alkali metal oxide glass which has a reformed surface due to having been immersed in an aqueous solution containing potassium formate dissolved in water, and which is manufactured by the method of manufacturing a glass substrate as defined by claim 1.

6. A magnetic recording medium, comprising the glass substrate as defined by claim 5 which has a reformed surface due to having been immersed in an aqueous solution containing potassium formate dissolved in water.

7. The method of manufacturing a glass substrate according to claim 1, wherein the process temperature ranges from 130° C. to 140° C., and wherein the process time ranges from 60 to 270 minutes.

8. The method of manufacturing a glass substrate according to claim 1, wherein the aqueous solution has a temperature of at most 200° C. during immersing.

9. The method of manufacturing a glass substrate according to claim 1, wherein the process temperature ranges from 130° C. to 150° C., and wherein the process time ranges from 15 to 270 minutes.

* * * * *